US008099338B2

(12) United States Patent
Betzler et al.

(10) Patent No.: US 8,099,338 B2
(45) Date of Patent: Jan. 17, 2012

(54) MANAGEMENT OF VIRTUAL UNIVERSE ITEM RETURNS

(75) Inventors: Boas Betzler, Magstadt (DE); Kulvir S. Bhogal, Fort Worth, TX (US); Rick A. Hamilton, II, Charlottesville, VA (US); Jenny S. Li, Danbury, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 12/135,291

(22) Filed: Jun. 9, 2008

(65) Prior Publication Data

US 2009/0307110 A1 Dec. 10, 2009

(51) Int. Cl.
*G06Q 10/00* (2006.01)
*A63F 9/24* (2006.01)

(52) U.S. Cl. .............................. 705/28; 463/1
(58) Field of Classification Search .................... 705/28; 463/1
See application file for complete search history.

(56) References Cited

U.S. PATENT DOCUMENTS

| | | | | |
|---|---|---|---|---|
| 6,119,229 A * | 9/2000 | Martinez et al. | ............... | 726/28 |
| 6,343,738 B1 * | 2/2002 | Ogilvie | .................. | 235/381 |
| 6,591,250 B1 * | 7/2003 | Johnson et al. | ................. | 705/51 |
| 7,249,139 B2 * | 7/2007 | Chuah et al. | ........................ | 1/1 |
| 7,517,282 B1 * | 4/2009 | Pryor | ............................ | 463/42 |
| 7,593,864 B2 * | 9/2009 | Shuster | ......................... | 705/26.1 |
| 7,713,116 B2 * | 5/2010 | Keam et al. | ....................... | 463/1 |
| 7,780,532 B2 * | 8/2010 | Van Luchene | .................. | 463/42 |
| 7,824,253 B2 * | 11/2010 | Thompson et al. | .............. | 463/7 |
| 7,958,047 B2 * | 6/2011 | Jung et al. | ........................ | 705/38 |
| 7,958,055 B2 * | 6/2011 | Hsu et al. | ......................... | 705/53 |
| 2001/0007979 A1 * | 7/2001 | Teshima | .......................... | 705/26 |
| 2001/0049651 A1 * | 12/2001 | Selleck | .......................... | 705/37 |
| 2001/0056383 A1 * | 12/2001 | Shuster | .......................... | 705/27 |
| 2002/0073043 A1 * | 6/2002 | Herman et al. | ................. | 705/64 |
| 2002/0095387 A1 * | 7/2002 | Sosa et al. | ....................... | 705/65 |
| 2002/0125312 A1 * | 9/2002 | Ogilvie | .......................... | 235/380 |
| 2003/0014423 A1 | 1/2003 | Chuah et al. | | |
| 2004/0143852 A1 * | 7/2004 | Meyers | .......................... | 725/133 |
| 2004/0268386 A1 * | 12/2004 | Logan et al. | ..................... | 725/34 |
| 2005/0102188 A1 * | 5/2005 | Hutchison et al. | .............. | 705/26 |
| 2005/0240531 A1 * | 10/2005 | Wolff, Jr. | ......................... | 705/53 |
| 2005/0253840 A1 * | 11/2005 | Kwon | ............................ | 345/419 |
| 2006/0178975 A1 * | 8/2006 | Jung et al. | ........................ | 705/35 |
| 2007/0087822 A1 * | 4/2007 | Van Luchene | ................... | 463/25 |
| 2007/0087831 A1 * | 4/2007 | Van Luchene et al. | ......... | 463/42 |
| 2007/0111770 A1 * | 5/2007 | Van Luchene | .................... | 463/7 |
| 2007/0155508 A1 * | 7/2007 | Sun et al. | ........................ | 463/42 |
| 2007/0288387 A1 * | 12/2007 | Park et al. | ......................... | 705/59 |
| 2008/0004094 A1 * | 1/2008 | Mueller et al. | .................... | 463/1 |
| 2008/0004116 A1 * | 1/2008 | Van Luchene et al. | ......... | 463/42 |

(Continued)

*Primary Examiner* — Matthew S Gart
*Assistant Examiner* — Ashford S Hayles
(74) *Attorney, Agent, or Firm* — William Schiesser; Hoffman Warnick LLC

(57) ABSTRACT

The present invention relates to relates to the management of virtual universe item returns. A method for in accordance with an embodiment of the present invention includes: initiating a return of a item by a user in a virtual universe; granting control of the return of the item to a return agency, the return agency submitting a return request on behalf of the user to a vendor associated with the item; upon approval of the return request by the vendor, sending instructions to the user to destroy the item; and upon confirmation of the destruction of the item by the user, crediting the user for the return.

20 Claims, 3 Drawing Sheets

U.S. PATENT DOCUMENTS

| | | | |
|---|---|---|---|
| 2008/0133392 A1* | 6/2008 | Jung et al. | 705/35 |
| 2008/0162317 A1* | 7/2008 | Banaugh et al. | 705/35 |
| 2008/0208749 A1* | 8/2008 | Wallace et al. | 705/44 |
| 2008/0220876 A1* | 9/2008 | Mehta et al. | 463/42 |
| 2008/0228607 A1* | 9/2008 | Jung et al. | 705/30 |
| 2008/0282090 A1* | 11/2008 | Leybovich | 713/182 |
| 2008/0288343 A1* | 11/2008 | Ho et al. | 705/14 |
| 2009/0144633 A1* | 6/2009 | Schultz et al. | 715/742 |
| 2009/0210885 A1* | 8/2009 | Bantz et al. | 719/313 |
| 2009/0287765 A1* | 11/2009 | Hamilton et al. | 709/203 |
| 2009/0307021 A1* | 12/2009 | Hamilton et al. | 705/7 |
| 2010/0030578 A1* | 2/2010 | Siddique et al. | 705/3 |
| 2010/0210349 A1* | 8/2010 | Blair et al. | 463/23 |

\* cited by examiner

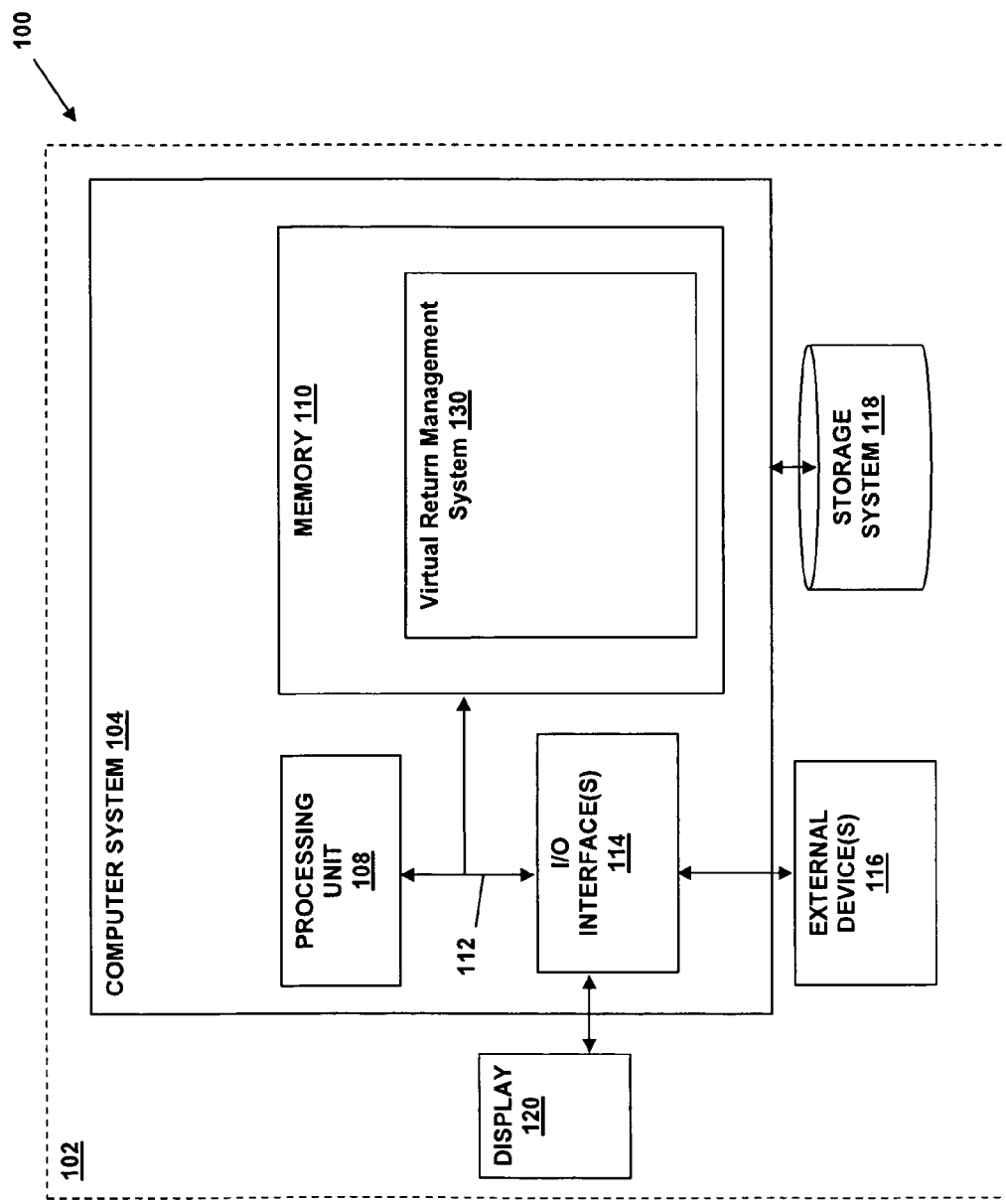

MANAGEMENT OF VIRTUAL UNIVERSE ITEM RETURNS

FIELD OF THE INVENTION

The present invention relates to a virtual universe, and more specifically relates to the management of virtual universe item returns.

BACKGROUND OF THE INVENTION

A virtual universe is an interactive simulated environment accessed by multiple users through an online interface. Users inhabit and interact in the virtual universe via avatars, which are two or three-dimensional graphical representations of humanoids. There are many different types of virtual universes, however there are several features many virtual universes generally have in common:
A) Shared Space: the virtual universe allows many users to participate at once.
B) Graphical User Interface: the virtual universe depicts space visually, ranging in style from 2D "cartoon" imagery to more immersive 3D environments.
C) Immediacy: interaction takes place in real time.
D) Interactivity: the virtual universe allows users to alter, develop, build, or submit customized content.
E) Persistence: the virtual universe's existence continues regardless of whether individual users are logged in.
F) Socialization/Community: the virtual universe allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes, such as that provided in the on-line world Second Life (Second Life is a trademark of Linden Research in the United States, other countries, or both). The Second Life client program provides its users (referred to as residents) with tools to view, navigate, and modify the Second Life world and participate in it's virtual economy.

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new business interactions, methods and mechanisms.

One aspect in virtual universe e-commerce is the management of the "return" of purchased virtual items, which are found in an avatar's inventory. For example, a user may have purchased virtual hair, clothing, footwear, gestures, artwork, tools, buildings, pets, etc., and, as in the real world, may want to return some items after a period of time if the user is not satisfied with the items.

SUMMARY OF THE INVENTION

The present invention is directed to the management of virtual universe item returns.

A first aspect of the present invention is directed to a method for managing an item return in a virtual universe, comprising: initiating a return of an item by a user in a virtual universe; granting control of the return of the item to a return agency, the return agency submitting a return request on behalf of the user to a vendor associated with the item; upon approval of the return request by the vendor, sending instructions to the user to destroy the item; and upon confirmation of the destruction of the item by the user, crediting the user for the return.

A second aspect of the present invention is directed to a system for managing an item return in a virtual universe, comprising: a system for initiating a return of an item by a user in a virtual universe; a system for granting control of the return of the item to a return agency, the return agency submitting a return request on behalf of the user to a vendor associated with the item; a system for sending instructions to the user to destroy the item, upon approval of the return request by the vendor; and a system for crediting the user for the return, upon confirmation of the destruction of the item by the user.

A third aspect of the present invention is directed to a program product stored on a computer readable medium, which when executed, manages an item return in a virtual universe, the computer readable medium comprising program code for: initiating a return of an item by a user in a virtual universe; granting control of the return of the item to a return agency, the return agency submitting a return request on behalf of the user to a vendor associated with the item; sending instructions to the user to destroy the item, upon approval of the return request by the vendor; and crediting the user for the return, upon confirmation of the destruction of the item by the user.

A fourth aspect of the present invention is directed to a method for deploying an application for managing an item return in a virtual universe, comprising: providing a computer infrastructure being operable to: initiate a return of an item by a user in a virtual universe; grant control of the return of the item to a return agency, the return agency submitting a return request on behalf of the user to a vendor associated with the item; send instructions to the user to destroy the item, upon approval of the return request by the vendor; and credit the user for the return, upon confirmation of the destruction of the item by the user.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 3 depicts an illustrative computer system for implementing embodiment(s) of the present invention.

Figure 1:
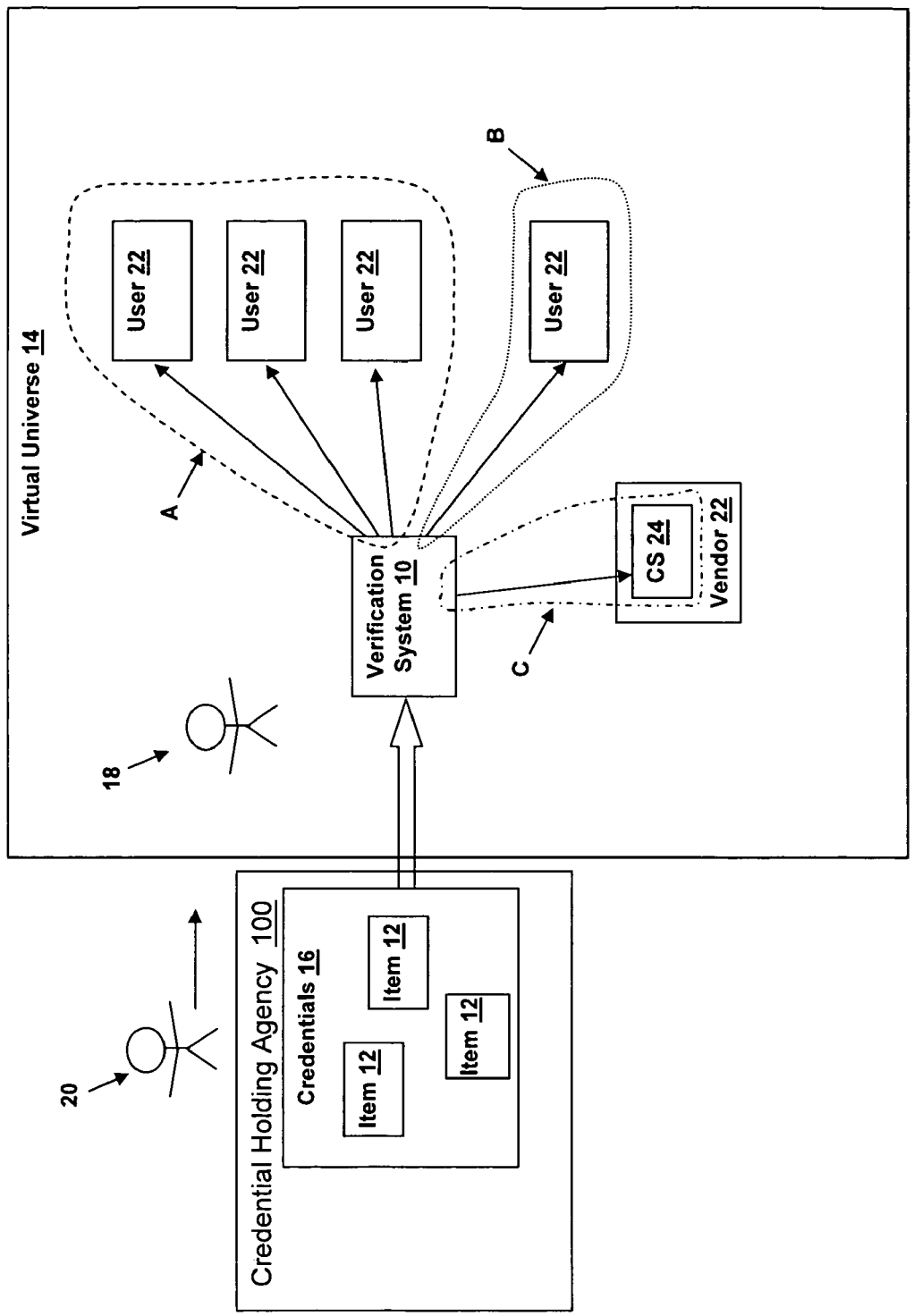
FIG. 1 depicts an illustrative system for managing virtual universe item returns in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to the management of virtual universe item returns.

As depicted in FIG. 1, the present invention provides a return agency 10 for managing the return of purchased items 12 in a virtual universe 14.

For this invention, focus is on virtual, or non-depleting, items 12 in the inventory 16 of an avatar 18 controlled by a user 20. Non-depleting items 12 in the context of this invention comprise virtual items or resources that can be registered as items of ownership stored in the inventory 16 of an avatar 18, and which do not deteriorate physically. Non-depleting items 12 may comprise, for example, virtual items such as clothes, footwear, hair, gestures, artwork, tools, buildings, pets, concert tickets, programming scripts and other items existing solely of code or other software embodiments, which have meaning solely within the virtual universe setting.

In a virtual universe 14, an item 12 to be returned does not need to be physically shipped to a vendor, as it would be in the real world, for example, when returning an article of clothing. To this extent, the term "return" refers to the disabling of a purchased item 12 within the virtual universe 14. For example, programming code can be activated to disable a purchased item 12 from being used and displayed in the virtual universe 14 by the user who purchased the item. As another example, the license of a purchased item 12 can be rendered invalid. Other suitable methodologies for disabling a purchased item 12 can also be employed. In general, the return agency 10 of the present invention "receives" the item 12 from an avatar 18, determines information such as the item ID, vendor ID, and purchaser ID of the item 12, and performs the necessary "return" and financial compensation to the avatar 18.

Each vendor 22 in the virtual universe 14 may establish a set of item return policies including, for example, the return window in the virtual universe 14 where an item 12 can be returned, penalty fees, number of total usage, etc. The return agency 10 facilitates the return process for avatars 18 and provides a means for vendors 22 to collect returned items 12 from the return agency 10.

The return agency 10 may comprise, for example:
A) A transvendor return agency (indicated by A in FIG. 1) that has established agreements with (e.g., is affiliated with) a plurality of vendors 22 to handle returns on the vendors' behalf. A transvendor return agency may charge vendors 22 and/or avatars 18 a processing fee.
B) A single vendor (univendor) return agency (indicated by B in FIG. 1) that represents a particular vendor 22 and handles returns for that vendor 22. The univendor return agency may charge the vendor 22 and/or avatar 18 a processing fee.
C) A customer service (CS) department 24 of a given vendor 22 (indicated by C in FIG. 1) that handles returns for that vendor 22. A (CS) department of a vendor 22 may charge an avatar 18 a processing fee.

Figure 2:
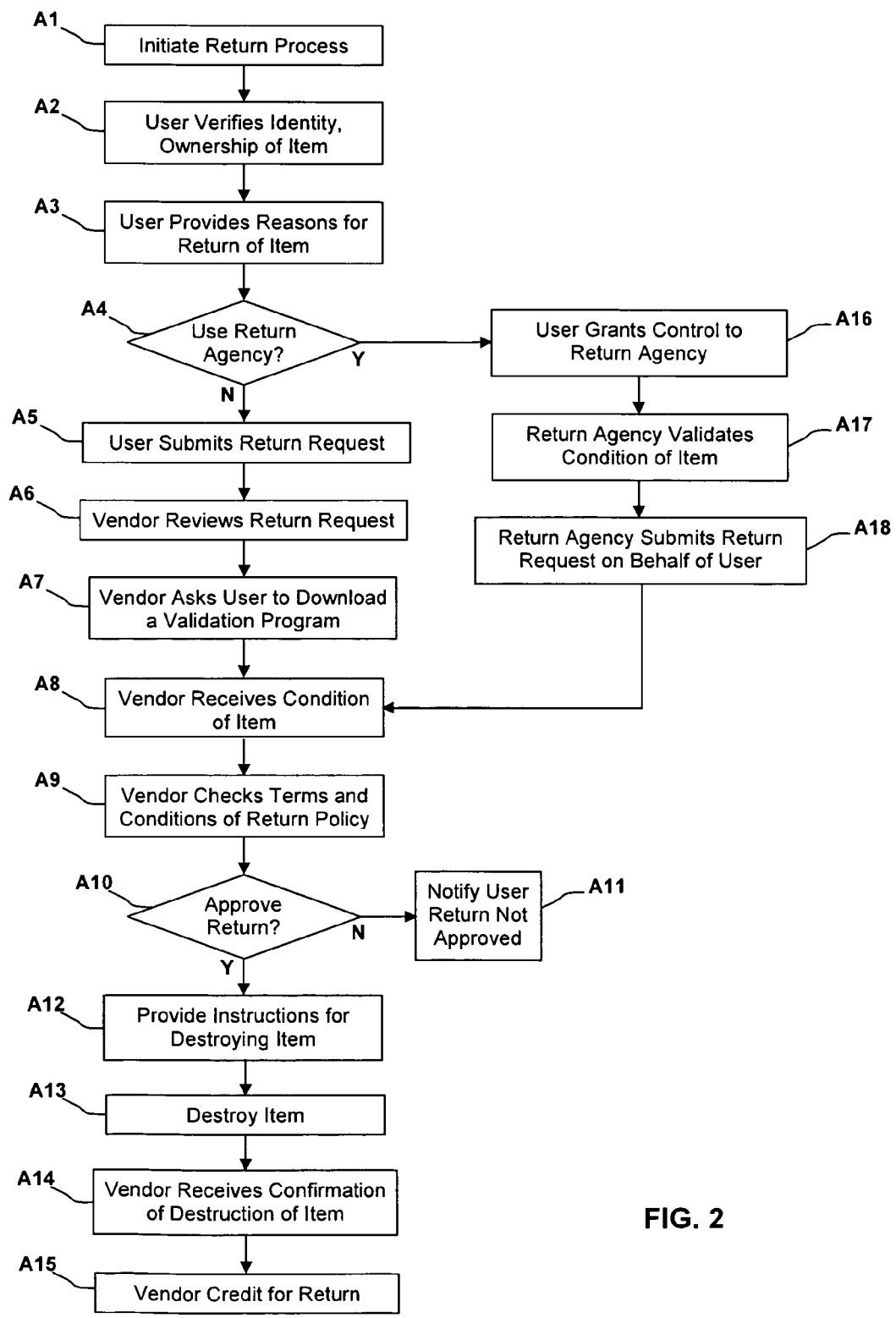
FIG. 2 depicts an illustrative process in accordance with an embodiment of the present invention.

An illustrative item return process in accordance with an embodiment of the present invention is depicted in FIG. 2, and is described below with reference to FIG. 1. At A1, a user 20 initiates the return process. For example, the user 20 can select an item 12 from inventory 16 for return via an inventory user interface (UI) by "right-clicking" on the item 12 and selecting a contextual menu item for "return item." Many other selection mechanisms are also possible.

Transactions in a virtual universe 14 may be assigned a transaction ID at the time of purchase of an item 12, to facilitate a potential subsequent return of the item 12. Since it is possible to duplicate items 12 in a virtual universe 14, the user 20 may be asked to provide a security question and answer when purchasing an item 12. As such, at A2, to return the item 12, the user 20 answers the security question to verify their identity and ownership of the item 12.

At A3, the user 20 provides information, such as the reason for the return of the item 12. Further, the user 20 may be asked questions such as "How many times have you replicated the item?", "Have you altered the item, such as changing the shape, length, color or in another other format?", etc.

At A4, the user 20 chooses whether or not to use a return agency 10 to return the item 12. One advantage of using a return agency 10 is that the return agency 10 will represent the user 20 for the rest of the return process and will deal with the associated vendor 22 on behalf of the user 20. The user 20 may have to pay a processing fee to the return agency 10 for handling the return of the item 12 on their behalf.

If the user 20 does not want to use a return agency 10 (NO, A4), the user 20 submits the return request themselves to the associated vendor 22 at A5. At A6, the vendor 22 reviews the return request. The vendor 22 then requests at A7 the user 20 to download software for validating the condition of the item 12 to be returned, and subsequently receives information regarding the condition of the item 12. After the vendor 22 has received information regarding the condition of the item 12 to be returned at A8 (e.g., if the item has been duplicated/copied, if the capacity limit has been filled, etc.), the vendor 22 checks the terms and conditions of the return policy at A9. If the item 12 to be returned meets the terms and conditions of the return policy, the vendor 22 approves the return of the item 12 (YES, A10). If the return is not approved by the vendor 22 (NO, A10), the user 20 is notified at A11.

The user 20 can be notified of the approval/refusal of the return of an item 12 in many different ways. For example, a message can be sent to the user 20 via electronic mail (email), instant messaging, etc. If the request is approved (YES, A10), the vendor 22 can notify and provide (A12) the requester (either the user 20 or the return agency 10 acting on behalf of the user 20) instructions to download a program, which when executed, destroys the returned item 12 (A13). The destruction of an item 12 can comprise, for example, invalidating the license of the item 12, removing all instances of the item 12, removing the item 12 from the inventory 16, etc).

After the vendor 22 receives confirmation (A14) that the item has been destroyed, the vendor 22 can send (A15) the requester (either the user 20 or the return agency 10 acting on behalf of the user 20) credit as specified in the terms and conditions. If a return agency 10 is used, the return agency 10 may take a processing fee and refund the appropriate portion to the user 20.

Returning to A4, if the user 20 chooses to use a return agency 10 (YES, A4), flow passes to A16. At A16, the user 20 grants control to the return agency 10 to update the inventory 16. This can include, for example, granting access control to the return agency 10 to access the avatar's inventory 16 temporarily during the return process. The return agency 10 can have, for example, read, write, and execute rights to the item 12 to be returned during the return process. At A17, the return agency 10 validates the condition of the item 12 to be returned. At A18, the return agency 10 submits a request for the return of the item 12 and the condition of the item 12 to the associated vendor 22 on behalf of the user 20. Flow then passes to A8.

The return agency 10 can be configured to validate the authenticity of a returned item 12 and to ensure that the returned item 12 was originally bought by a user 20. To provide this functionality, the return agency 10 can access vendor records including, for example:
A) Who purchased an item 12.
B) When an item 12 was purchased (i.e., information useful for determining if a return will violate a return policy).

These vendor records can be centrally stored in/by the return agency 10 and/or accessed using a federated model wherein the return agency 10 interacts with the individual vendor databases.

A virtual item ID, provided to each item 12, can be used to identify unique instances of the item 12. The return agency 10 can be responsible for the generation of the unique virtual item IDs. The virtual item ID will act as a key from which the return agency 10 can determine information on the vendor 22 of the item 12 as well as buyer information including:
A) Who bought the virtual item.
B) Purchase price of the item.
C) Date of purchase of the item.
D) Name of vendor of the item.
A virtual item ID can be embedded within an item 12 as metadata. When a user 20 opts to return the item 12, the virtual item ID can be provided.

For non-depleting items, vendors 22 may have to set extra restrictions on an item 12 to be returned to ensure that the item 12 is authentic. For example, duplicated instances of an item 12 cannot be returned, an original item 12 that has been replicated cannot be returned, or an item 12 that has been altered in any way cannot be returned (such as altering the shape, color, length etc). This is to ensure a user 20 actually returns an item 12 that he/she does not want to keep. To track if an item 12 has been duplicated, a tag or special attribute can be added to the original item 12 as well as to duplicate instances of the item 12 to indicate that the item 12 has being duplicated. Similarly, whenever a user 20 alters an item 12, a special attribute can be added to the item 12 to indicate it has been altered and it is no longer in its original form.

Several measures can be performed by the return agency 10 before/when accepting a return request. For instance, when returning an item 12, the return agency 10 can:
A) Ensure that the returned item 12 is being returned within the period of time allotted by the vendor 22 of the item 12.
B) Apply any processing fees that the vendor 22 has associated with the item.
C) Ensure that the item 12 is one that is deemed returnable by the vendor 22, including the authenticity of the item 12 (e.g., a duplicated item 12 cannot be returned, or duplicated copies cannot be returned).
D) Apply prorated/appropriate partial credit for items 12 that were not returned in their full capacity (e.g., an item 12 that has been altered in any way).
E) Opt not to return an item 12 if the item is regarded as damaged (as defined by the vendor 22). For example, an item 12 with a capacity that can be depleted might be regarded as damaged if any of the item 12 was used. As an example, a user is not allowed to return a song after it has been played.

The return agency 10 of the present invention provides numerous advantages. For instance, the return agency 10 provides a service to both users 20 and vendors 22, saves the user 20 time and effort to follow up with a return request, and handles validation of the item 12 and performs other measures which shorten the steps required by the vendor 22 to process a return request. The return agency 10 also saves the vendor 22 operation costs as the return agency 10 will ensure all the required information from the user 10 is provided before submitting a return request.

FIG. 3 depicts an illustrative system 100 for the management of virtual universe item returns in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as virtual universe item return management system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 3 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for managing a non-depleting virtual item return in a virtual universe performed using at least one computing device, the method comprising:
   initiating a return of the virtual item by a user in the virtual universe using the at least one computing device, granting control of the return of the virtual item to a return agency using the at least one computing device, the return agency validating a condition of the virtual item and submitting a return request on behalf of the user to a vendor in the virtual universe associated with the virtual item, the validating of the condition includes determining whether the virtual item has been duplicated or altered, and the return request includes an indication of the condition of the virtual item;
   upon approval of the return request by the vendor in the virtual universe, sending instructions to the user to destroy disable the virtual item using the at least one computing device, the approval of the return request is based on the condition of the virtual item being within vendor defined requirements; and
   upon confirmation of the destruction disabling of the virtual item by the user, crediting the user for the return using the at least one computing device.

2. The method of claim 1, wherein the return agency is affiliated with a plurality of different vendors in the virtual universe.

3. The method of claim 1, wherein disabling the virtual item includes activating programming code which restricts the virtual item from being at least one of, used in the virtual universe.

4. The method of claim 1, wherein initiating the return of the item further comprises:
   verifying an identity of the virtual item,
   wherein verifying the identity of the virtual item includes comparing a virtual item transaction ID to an original vendor transaction ID;
   and
   verifying user ownership of the virtual item,
   wherein verifying user ownership of the virtual item includes prompting a response to a security question.

5. The method of claim 1, wherein the virtual item includes a virtual item ID which is embedded within the virtual item as metadata.

6. The method of claim 1, wherein the virtual item includes either or both of a tag or a special attribute which is activated whenever a virtual item is duplicated or altered.

7. The method of claim 1, wherein crediting the user for the return further comprises:
   charging the user a processing fee.

8. The method of claim 1, wherein the return agency performs at least one of the following:
   identifying the vendor of the item to be returned;
   identifying a return policy of the vendor for the item to be returned;
   ensuring that the item is being returned within a period of time allotted by the vendor;
   applying any processing fees that the vendor has associated with the item;
   ensuring that the item is deemed returnable by the vendor;
   applying partial credit for the item if the item is not in its full capacity;
   refusing to return the item if the item is regarded as damaged, as defined by the vendor; and
   keeping a return record of each item in a database.

9. The method of claim 1, wherein granting control of the return of the item to the return agency further comprises:
   providing the user an option to use the return agency;
   granting access control to the return agency for accessing the item from an inventory of the user during a duration of the return process;
   and
   generating a virtual item identifier for the item.

10. A system for managing a non-depleting virtual item return in a virtual universe, comprising:
    a system for initiating a return of the virtual item by a user in the virtual universe;
    a system for granting control of the return of the virtual item to a return agency, the return agency validating a condition of the virtual item and submitting a return request on behalf of the user to a vendor in the virtual universe associated with the virtual item, wherein the validating of the condition includes determining whether the virtual item has been duplicated or altered, and the return request includes an indication of the condition of the virtual item;
    a system for sending instructions to the user to disable the virtual item, upon approval of the return request by the vendor in the virtual universe, wherein approval of the return request is based on the condition of the virtual item meeting vendor defined requirements; and a system for crediting the user for the return, upon confirmation of the disabling of the virtual item by the user.

11. A program product stored on a computer readable medium, which when executed, manages a non-depleting virtual item return in a virtual universe, the computer readable medium comprising program code for:

initiating a return of the virtual item by a user in the virtual universe;

granting control of the return of the virtual item to a return agency, the return agency validating a condition of the virtual item and submitting a return request on behalf of the user to a vendor in the virtual universe associated with the virtual item, wherein the validating of the condition includes determining whether the virtual item has been duplicated or altered, and the return request includes an indication of the condition of the virtual item;

sending instructions to the user to disable the virtual item, upon approval of the return request by the vendor in the virtual universe, wherein approval of the return request is based on the condition of the virtual item meeting vendor defined requirements; and crediting the user for the return, upon confirmation of the disabling of the virtual item by the user.

12. The program product of claim 11, wherein the return agency is affiliated with a plurality of different vendors in the virtual universe.

13. The program product of claim 11, wherein disabling the virtual item includes activating programming code which restricts the virtual item from being either of used or displayed in the virtual universe.

14. The program product of claim 11, wherein initiating the return of the item further comprises:

verifying an identity of the virtual item, wherein verifying the identity of the virtual item includes comparing a virtual item transaction ID to an original vendor transaction ID;

and verifying user ownership of the virtual item, wherein verifying user ownership of the virtual item includes prompting a response to a security question.

15. The program product of claim 11, wherein the virtual item includes a virtual item ID which is embedded within the virtual item as metadata.

16. The program product of claim 11, wherein the virtual item includes either or both of a tag or a special attribute which is activated whenever a virtual item is duplicated or altered.

17. The program product of claim 11, wherein crediting the user for the return further comprises:

charging the user a processing fee.

18. The program product of claim 11, wherein the return agency performs at least one of the following:

identifying the vendor of the item to be returned;

identifying a return policy of the vendor for the item to be returned;

ensuring that the item is being returned within a period of time allotted by the vendor;

applying any processing fees that the vendor has associated with the item;

ensuring that the item is deemed returnable by the vendor;

applying partial credit for the item if the item is not in its full capacity;

refusing to return the item if the item is regarded as damaged, as defined by the vendor; and keeping a return record of each item in a database.

19. The program product of claim 11, wherein granting control of the return of the item to the return agency further comprises:

providing the user an option to use the return agency;

granting access control to the return agency for accessing the item from an inventory of the user during a duration of the return process;

and generating a virtual item identifier for the item.

20. A method for deploying an application for managing a virtual item return in a virtual universe, the method comprising:

providing a computer infrastructure being operable to:

initiate a return of the virtual item by a user in the virtual universe; grant control of the return of the virtual item to a return agency, the return agency validating a condition of the virtual item and submitting a return request on behalf of the user to a vendor in the virtual universe associated with the virtual item, wherein the validating of the condition includes determining whether the virtual item has been duplicated or altered, and the return request includes an indication of the condition of the virtual item;

send instructions to the user to disable the virtual item, upon approval of the return request by the vendor in the virtual universe, wherein approval of the return request is based on the condition of the virtual item meeting vendor defined requirements; and credit the user for the return, upon confirmation of the disabling of the virtual item by the user.

* * * * *